United States Patent [19]

Evans

[11] 4,197,168

[45] Apr. 8, 1980

[54] RECOVERY OF ANTHRAQUINONE FROM TALL OIL

[75] Inventor: James M. Evans, Lynn Haven, Fla.

[73] Assignee: SCM Corporation, Cleveland, Ohio

[21] Appl. No.: 913,324

[22] Filed: Jun. 7, 1978

[51] Int. Cl.$^2$ ............................ B01D 3/00; C09B 1/00
[52] U.S. Cl. ........................................ 203/74; 203/91;
260/97.6; 260/97.7; 260/369; 162/16
[58] Field of Search .................... 260/369, 97.6, 97.7;
162/16; 203/91, 94, 73, 74

[56] References Cited

U.S. PATENT DOCUMENTS

| | | | |
|---|---|---|---|
| 2,724,709 | 11/1955 | Spence | 260/97.6 |
| 2,886,492 | 5/1959 | Hanson et al. | 260/97.6 |
| 3,701,712 | 10/1972 | Samuelson et al. | 162/72 |
| 3,870,730 | 3/1975 | Scharfe et al. | 260/369 |
| 4,005,060 | 1/1977 | Mannbro | 162/16 |
| 4,012,280 | 3/1977 | Holton | 162/72 |
| 4,064,117 | 12/1977 | Leavens et al. | 260/97.7 |

*Primary Examiner*—Wilbur L. Bascomb, Jr.
*Attorney, Agent, or Firm*—Merton H. Douthitt; Gordon P. Becker; Jerry K. Mueller, Jr.

[57] ABSTRACT

Tall oil containing anthraquinone is fractionally distilled for producing the tall oil heads cut enriched in said anthraquinone.

6 Claims, No Drawings

RECOVERY OF ANTHRAQUINONE FROM TALL OIL

BACKGROUND OF THE INVENTION

This invention relates to a process for recovering anthraquinone from tall oil containing anthraquinone and to a novel tall oil product comprising tall oil heads containing anthraquinone.

Recent advances in the paper industry have shown that anthraquinone is an effective digestion additive which improves the paper pulping operation. Improvements in the paper pulping operation include decreased pulping times and improved yields of cellulosic material from the pulping operation. In the manufacture of paper pulp by alkaline processes, such as the Kraft process, black liquor is separated from the cellulosic portion of the wood and concentrated for separation of tall oil soap skimmings therefrom. It now has been determined that the anthraquinone additive added in the pulping operation is found in the tall oil recovered from the black liquor. Because anthraquinone is an expensive product, its recovery from tall oil for reuse in the pulping operation is desirable. The present invention provides a method for recovery of anthraquinone from tall oil in efficient and simple fashion.

BROAD STATEMENT OF THE INVENTION

The present invention is a process for treating tall oil containing anthraquinone for recovery of same. Such process comprises fractionally distilling the tall oil in a fractional distillation zone held under reduced pressure for producing a tall oil heads fraction enriched in said anthraquinone. The resulting tall oil heads fraction containing the anthraquinone then is withdrawn from the fractional distillation zone and, optionally, further rectified for further concentrating the anthraquinone. The resulting tall oil product of the present invention comprises tall oil heads containing from about 10% to 95% anthraquinone.

DETAILED DESCRIPTION OF THE INVENTION

The black liquor separated from the cellulosic portion of the wood contains among other things sodium sulfate, sodium sulfide, sodium phenates, sodium salts of lignin material (lignates), fatty acid soaps, rosin soaps, unsaponifiable compounds, and some fiber. When the liquor is concentrated, most of the soaps will separate and float on the liquor as an amorphous viscous layer ("soap skimmings") often containing a small portion of occluded, concentrated black liquor. A simple recovery of crude tall oil from such soap skimmings is done by vigorously mixing them with aqueous acid (usually sulfuric acid) to liberate or spring the tall oil acids, settling the resulting mixture, and decanting or centrifuging off the resulting free acid-rich less dense phase (crude tall oil). Such operation itself affects some purification of the tall oil acids and is satisfactory for processing in accordance with this invention. Lignates and other contaminates can be removed more effectively by washing or extracting the soap skimmings with aqueous salt, eg. sodium sulfate, solution that is slightly acid, neutral, or preferably slightly basic to separate the cleansed soap prior to or in line with the springing operation.

Also, it is typical of tall oil processing operations to take the resulting crude tall oil and subject it to a pitch stripping operation for removing a fair amount of the unsaponifiable content of the crude tall oil. Unsaponifiables proponderate in high boiling or long chain alcohols and sterols, aldehydes, rosin degradation products including the decarboxylated resin acids, some hydrocarbons and carbonyls, and dimethoxy stilbene. Representative treatment processes for this pitch-stripping operation can be found in U.S. Pat. Nos. 3,803,114; 2,530,809; and 2,530,810, the disclosures of which are expressly incorporated herein by reference. These patents teach that aqueous methanolic solutions of soap skimmings can be extracted with hexane or the like for removal of unsaponifiables. The thus-cleansed soap then can be acidulated for springing the tall oil acids therefrom. Preferably, the tall oil fed to the instant process has been subjected to a pitch-stripping operation prior to its admittance to the present process, though this is not essential.

The feed crude tall oil containing anthraquinone, desirably pitch-stripped, contains among other things tall oil acids which consist of so-called fatty acids, resin acids, and unsaponifiables as previously enumerated. Fatty acids in the crude tall oil mostly are $C_{16-18}$ straight chain primary monocarboxylic acids and resin acids are fused triple ring polycyclic tertiary monocarboxylic acids, typically by abietic acid. Such crude tall oil is admitted into a fractional distillation zone held under reduced pressure and elevated temperature. Pressures for the fractional distillation zone generally range between about 1 and about 150 Torr, and preferably between about 25 and about 75 Torr, and temperatures range from about 150° to about 350° C., and preferably between about 215° and about 290° C. for the present process. The fractional distillation zone preferably is a conventional fractional distillation column with external reboiler and optionally a short packed section at the top that is irrigated lightly with condensate.

The crude tall oil is fractionated or rectified into various cuts which are withdrawn from the fractional distillation zone. From the top of a fractional distillation column to the bottom of such column, these cuts typically include a tall oil heads cut, a crude fatty acid cut, a distilled tall oil cut, a rosin cut, and the rosin bottoms which do not distill in the zone. The tall oil heads cut usually amounts to about 5 to about 15% of the crude tall oil fed to the distillation zone.

Fortuitously, it was discovered that from this complicated mixture of ingredients which make up the crude tall oil fed to the process, that the anthraquinone concentrated in the tall oil heads cut withdrawn from such fractional distillation zone. Such tall oil heads are a distillation fraction of light boiling material obtained when tall oil was subjected to fractional distillation. Typically, it consists of a mixture of palmitic, oleic, and linoleic acids ranging from about 50 to 75%, with the remainder generally consisting of unsaponifiable material. Generally, the proportion of anthraquinone concentrated in the tall oil heads withdrawn from the fractional distillation zone ranges from about 10 to 95% by weight.

The tall oil heads containing anthraquinone fraction is a novel product and is useful in this form for returning to pulping operations or such fraction can be further rectified by subjecting this fraction to a similar fractional distillation operation as above described to provide a refined product further enriched in anthraquinone. Of course, various other processing techniques can be envisioned for further concentrating the anthraquinone in the tall oil heads product of this invention as is well known to those skilled in the art.

The following example shows how this invention can be practiced, but should not be construed as limiting the invention. In this specification all temperatures are in degrees Centigrade, all parts are parts by weight, and all percentages are weight percentages unless otherwise expressly indicated.

EXAMPLE

Pitch-stripped crude tall oil containing about 3% by weight anthraquinone is admitted into a distillation column operated at reduced pressure (from 25 Torr at the top of the column to 75 Torr at the bottom of the column) and a temperature of about 215° to 290° C. The crude tall oil usually will contain from about 1 to 10% by weight anthraquinone, but this figure can vary quite often depending upon many factors such as the amount of anthraquinone used in the pulping operation, for example.

The heads cut taken from the top of the column will amount to about 8% by weight of the crude tall oil admitted into the column. This heads cut will contain about 70% of the anthraquinone admitted to the process. The balance of the heads cut will be heads fatty acids (mainly palmitic, oleic, linoleic, and palmitoleic acids) and unsaponifiables. Generally, the anthraquinone-containing tall oil heads product will contain from about 5% to 95% anthraquinone, 5 to 75% heads fatty acids, and 2.5 to 25% unsaponifiables.

I claim:

1. A process for treating tall oil that has been recovered from black liquor by-product of an alkaline paper pulping operation using anthraquinone therein; said process comprising:
   fractionally distilling said tall oil in a fractional distillation zone held under reduced pressure and elevated temperature for producing a tall oil heads fraction enriched in said anthraquinone, and
   withdrawing said tall oil heads fraction from said zone.

2. The process of claim 1 wherein said zone is held under a pressure of about 1 to 150 Torr and a temperature of about 215° to 290° C.

3. The process of claim 1 wherein said tall oil heads fraction withdrawn from said zone contains from about 10 to 95% by weight anthraquinone.

4. The process of claim 1 wherein said tall oil heads fraction containing anthraquinone is returned to an alkaline paper pulping operation.

5. The process of claim 1 wherein said tall oil heads fraction is subjected to fractional distillation to produce a refined product further enriched in anthraquinone.

6. The process of claim 5 wherein said refined produce is returned to an alkaline paper pulping operation.

* * * * *